Feb. 6, 1962 S. A. W. JOLLIFFE 3,020,546

RADIO BEACONS

Filed Dec. 23, 1958

2 Sheets-Sheet 1

INVENTOR:
Sydney Arthur Walter Jolliffe
BY:
Baldwin & Wight
his ATTORNEYS

Feb. 6, 1962 S. A. W. JOLLIFFE 3,020,546

RADIO BEACONS

Filed Dec. 23, 1958 2 Sheets-Sheet 2

INVENTOR:
Sydney Arthur Walter Jolliffe
BY:
Baldwin & Wight
his ATTORNEYS 3,020,546

RADIO BEACONS

Sidney Arthur Walter Jolliffe, Maldon, England, assignor to Marconi's Wireless Telegraph Company Limited, London, England, a British company Filed Dec. 23, 1958, Ser. No. 782,445
Claims priority, application Great Britain Oct. 6, 1958
6 Claims. (Cl. 343—106)

Figure 1:
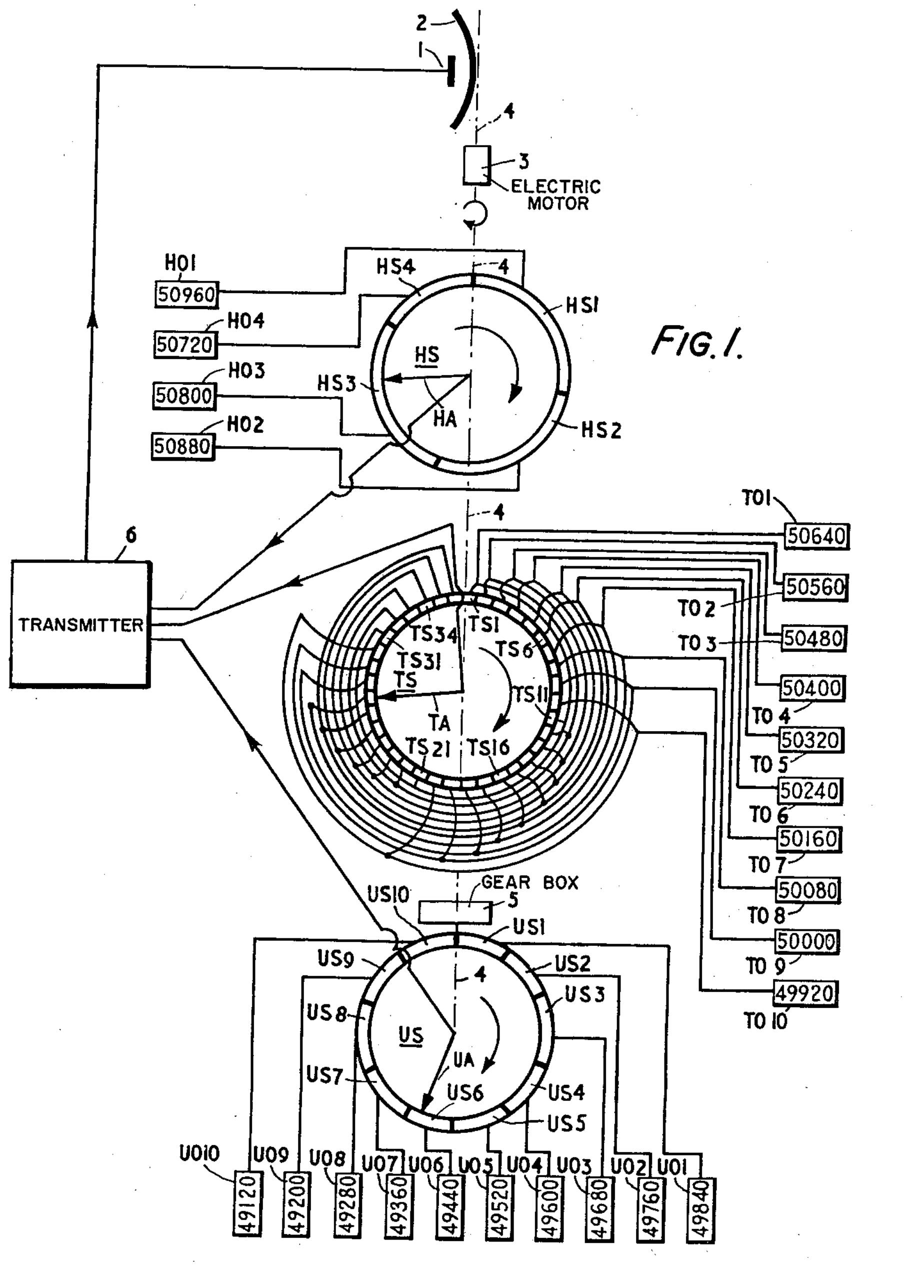

This invention relates to radio beacons and more particularly to radio beacons of the kind in which a sharply directional radio beam is swung in azimuth—usually, though not necessarily, rotated continuously round the azimuth circle—while at the same time the radio beam has imparted to it some varying azimuth-identifying characteristic so that a receiver through which the beam passes can identify the characteristic and ascertain the azimuthal direction of the beam at the time. The invention has for its object to provide improved and simple radio beacons of this kind which shall be capable of high intrinsic accuracy; which can be made of small bandwidth; and which can be designed to characterise different azimuthal directions which are only a small angle apart (for example only 1° apart) with a minimum of apparatus either at the beacon itself or at a co-operating receiver.

According to this invention the transmitted radio beam of a radio beacon is simultaneously modulated by at least two frequencies one of which is selected from a predetermined number of different predetermined frequencies each of which is appropriate to a different sector of a plurality of sectors of azimuth into which the whole range of azimuth variation of the beam is divided, and another of which is selected from a predetermined number of different predetermined frequencies each of which is appropriate to a different sub-sector of a plurality of sub-sectors into which each of the said sectors is divided, whereby each sub-sector is characterised by the transmission of a different combination of two modulation frequencies.

Preferably three modulating frequencies are simultaneously transmitted, the third frequency being selected from a predetermined number of predetermined frequencies each of which is appropriate to a different small sector of a plurality of small sectors into which each of the aforesaid sub-sectors is divided, whereby each small sector is characterised by the transmission of a different combination of three modulation frequencies. As will be seen later it is possible, by transmitting only three simultaneous modulation frequencies, to make each of the small sectors of only 1° of arc, i.e. it is possible thus to characterise and identify each degree of azimuth of a beacon which is rotated through 360° of azimuth. In a preferred embodiment of this nature for a beacon which is rotated through 360° of azimuth, there are four sectors, three of 100° and the fourth of 60°; 36 sub-sectors each of 10°; and 360 small sectors each of 1°; the sector-characterising frequency transmitted at any time being selected from four predetermined frequencies, the sub-sector-characterising frequency being selected from ten predetermined frequencies, and the small-sector-characterising frequency being selected from ten predetermined frequencies.

The simultaneously transmitted modulation frequencies may be derived from a like number (preferably, as above stated, three) of variable frequency oscillation sources which are varied in frequency to provide the required different frequencies. It is, however, preferred to produce the required frequencies by separate oscillators, one for each. This would involve 24 oscillators for a beacon with three simultaneous modulation frequencies and having 4 sectors (4 oscillators), 36 sub-sectors (10 oscillators) and 360 small sectors (10 oscillators) as above described, but such oscillators can be very small and compact and their frequencies can be chosen fairly close together—a substantial advantage in that such a choice means that the bandwidth occupied by the beacon can be kept small.

A receiver in accordance with this invention for co-operation with a beacon in accordance therewith comprises means for receiving the transmitted radio beam, means for recovering the modulation frequencies transmitted thereon, a plurality of filters each responsive to a different one of the possible modulation frequencies of said radio beam and indicator means selectively responsive to the plurality of modulation frequencies present at any given time.

A preferred receiver adapted to co-operate with a beacon rotating through 360° of azimuth and having four sectors (3 of 100° and 1 of 60°), 36 sub-sectors (each of 10°) and 360 small sectors (each of 1°) said beacon simultaneously transmitting three modulation frequencies, comprises means for receiving the transmitted radio beam from the beacon, means for recovering the three modulation frequencies thereof, 24 filters each selective of a different one of the 24 possible modulation frequencies of the beacon, means for feeding the received recovered modulation frequencies to all said filters in parallel, and three indicator devices adapted to read, respectively, hundreds, tens and units of degrees, the said devices being fed, respectively, from four filters each of which is selective of a different one of the sector-characterising frequencies, ten filters each of which is selective of a different one of the sub-sector-characterising frequencies and ten filters each of which is selective of a different one of the small-sector-characterising frequencies. Preferably the three indicator devices are so-called Dekatron or similar electronic discharge tubes.

Figure 2:
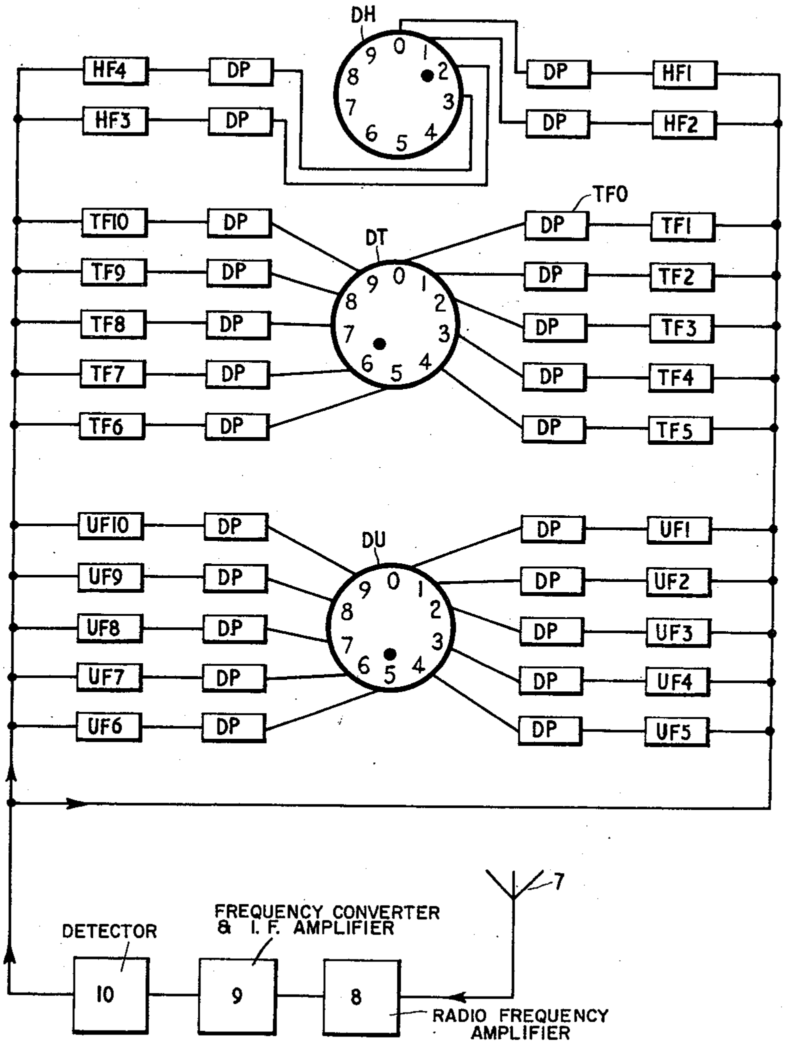

The invention is illustrated in the accompanying drawings in which FIGURE 1 is a simplified diagram of a preferred form of beacon in accordance with the invention, and FIGURE 2 is a simplified diagram of a preferred form of receiver in accordance with the invention and adapted to co-operate with a beacon as shown in FIGURE 1. In the drawings values of frequencies are marked on the oscillators and filters. It is to be understood that these frequencies are given by way of example only and are in no sense limiting.

Referring to FIGURE 1, the beacon therein shown comprises a rotatable directional aerial system of any suitable known kind and represented as consisting of an aerial proper 1 and a reflector 2 adapted to give a sharply directional radio beam. The aerial system is rotated continuously in azimuth at a predetermined desired constant speed in accordance with normal radio beacon practice by means of an electric motor 3 which rotates the aerial system by a drive represented by the chain line 4.

The motor 3 also drives through the drive 4 three distributor switches generally designated HS, TS and US having switch arms HA, TA and UA respectively. The arms HA and TA are driven directly by the drive 4 so as to run at the same speed as the aerial system, but a 1:36 speed step-up gear box 5 is inserted in the drive 4 between the switch TS and the switch US so that the switch arm UA runs at thirty-six times the speed of the aerial system.

The switch HS has four sector conductors HS1 to HS4 of which HS1, HS2 and HS3 each cover 100° of arc and sector conductor HS4, covers 60° of arc. Thus over the first hundred degrees of rotation of the aerial system from a datum direction, e.g. true north, the arm HA will be on HS1; over the next hundred degrees it will be on HS2;

over the next hundred degrees it will be on sector HS3; and over the last 60° of the circle it will be on HS4. The sector conductors HS1 to HS4 are fed respectively from oscillators HO1 to HO4 which are of different frequencies, for example, of the frequencies marked thereon in the figure.

The distributor switch TS has 36 sector conductors TS1 to TS36 each covering 10° of arc. So as not to complicate the drawing all the references to these sector conductors are not marked, only selected references being shown. It is to be understood, however, that the sector conductors are numbered consecutively TS1 to TS36 in a clockwise direction, and, as will be seen, the selected references shown are consistent with this. The sector conductors TS1, TS11, TS21 and TS31 are connected together and fed from an oscillator TO1; the conductors TS2, TS12, TS22 and TS32 are connected together and fed from an oscillator TO2 . . . and so on, each of the ten oscillators TO1 to TO10 feeding all those sector conductors whose references terminate in the same number as does the reference of the feeding oscillator. The ten oscillators are of different frequencies which may be, for example, of the values shown thereon in the figure.

The third distributor switch US which, as stated, runs at thirty-six times the speed of the other two switches, has ten sector conductor US1 to US10 fed respectively from oscillators UO1 to UO10, again all of different frequencies and having, for example, the frequency values shown.

It will be seen, therefore, that as the aerial rotates, each different degree of azimuth is characterised by the selection by the switches HS, TS and US of a different combination of three frequencies which will appear each on one or other of the switch arms HA, TA and UA. These frequencies are fed from the switch arms to a transmitter represented by the block 6 to modulate the high frequency of said transmitter, the block being assumed also to contain the modulating equipment. The high frequency transmitted may be of any suitable desired value.

The frequencies given in FIGURE 1 for the 24 oscillators are purely by way of example. They should, however, be so selected as to be conveniently separable by filters at a co-operating receiver and should be further so selected that no combination of any two or three frequencies will produce, by beating together, any other of the frequency values used in the system. It is also, of course, of importance to ensure that no two frequencies in the system are in harmonic relation.

It will be seen that with the switch arms HA, TA and UA in the positions shown in FIGURE 1, the three modulation frequencies which will be transmitted are those of the oscillators HO3, TO7 and UO6, i.e. 50,800, 50,160 and 49,440 c./s. The transmission of these three frequencies together characterises and identifies the azimuth direction of 265°.

FIGURE 2 shows a preferred form of receiver in accordance with this invention and adapted to co-operate with the beacon of FIGURE 1. It comprises a receiving aerial 7, a radio frequency amplifier 8, a frequency changer and intermediate frequency amplifier 9 and a detector 10, the latter feeding into 24 filters in parallel. These filters comprise four filters HF1 to HF4, each of which is selective to the frequency of the corresponding oscillator HO1 to HO4 at the beacon; 10 selective filters TF1 to TF10, each of which is selective to the frequency of the corresponding oscillator TO1 to TO10 at the beacon; and 10 selective filters UF1 to UF10, each of which is selective to the frequency of the corresponding oscillator UO1 to UO10 at the beacon. Each of these 24 filters feeds into a detector and pulse forming or shaping unit DP which produces from the input fed thereto squared pulses suitable for operating a so-called Dekatron indicator or similar electronic discharge tube. There are three Dekatrons, DH, DT and DU. The outputs from the filters HF1 to HF4 respectively are fed via the appropriate units DP to the 0, 1, 2 and 3 contacts of the Dekatron DH, the other six contacts of which are left unconnected. Similarly, the outputs derived from the filters TF1 to TF10 are fed respectively to the 0, 1, 2, 3, 4, 5, 6, 7, 8 and 9 contacts respectively of the Dekatron DT; and the outputs derived from the filters UF1 to UF10 are fed respectively to the contacts 0, 1, 2, 3, 4, 5, 6, 7, 8 and 9 of the last Dekatron DU. Accordingly the Dekatron DH will indicate the hundreds figure of the azimuthal direction of an incoming signal; the Dekatron DT will indicate the tens figure thereof; and the Dekatron DU will indicate the units figure thereof. With the beacon of FIGURE 1 having its switches in the positions shown so that the modulation frequencies 50,800, 50,160 and 49,440 c./s. are being transmitted to characterise the direction 265°, the indicators of a receiver as shown in FIGURE 2 in the path of the beam from the beacon at that time, will read 265° as is indicated by the dots against the FIGURES 2, 6 and 5 on the three Dekatrons respectively.

It may be in practice more convenient to arrange the Dekatrons to indicate the reciprocals of the azimuthal directions from the beacon, i.e. it may be more convenient to arrange the Dekatrons so that when the azimuthal direction is, as exemplified, 265°, the Dekatrons will read 085. It will be obvious to those skilled in the art how this can be done, since it merely involves changing the connections to the Dekatrons so that the readings given by the three indicators jointly indicate a figure differing from the azimuthal direction of the beacon by 180°. If this is done, the indicators of the receiving station will, of course, indicate the bearing of the beacon being received. This is commonly more convenient for navigation purposes.

Although the beacon illustrated uses 24 oscillators and the receiving equipment 24 filters, the said oscillators and filters can be relatively small, cheap and simple. Preferably they incorporate the now available frequency selective ferrite cored coil resonators as frequency determining elements, such resonators being very small and economical and quite capable of distinguishing between frequencies which are as close together as are those given in the figures. It will be noted that, with these particular values of frequencies, the total bandwidth of the transmitter (assuming double side band transmission) is only ±1840 c./s.

I claim:

1. A radio beacon system comprising means for radiating a sharply directional radio beam, means for varying the azimuthal direction of said beam in pre-determined manner and means for simultaneously modulating the transmitted beam with at least two azimuth indicating frequencies one of which is selected from a preletermined number of different predetermined frequencies each of which is appropriate to a different sector of a plurality of sectors of azimuth into which the whole range of azimuth variation of the beam is divided, and another of which is selected from a predetermined number of different predetermined frequencies each of which is appropriate to a different sub-sector of a plurality of sub-sectors into which each of the said sectors is divided, whereby each sub-sector is characterised by the transmission of a different combination of two modulation frequencies.

2. A beacon system as claimed in claim 1 wherein the beam is simultaneously modulated by three frequencies the third of which is selected from a predetermined number of predetermined frequencies each of which is appropriate to a different small sector of a plurality of small sectors into which each of the sub-sectors is divided, whereby each small sector is characterised by a transmission of different combination of three modulation frequencies.

3. A beacon system as claimed 2 wherein the beam is rotated through 360° of azimuth and wherein there are four sectors, three of 100° and the fourth of 60°; 36 sub-sectors each of 10°; and 360 small sectors each of 1°;

the sector-characterising frequency transmitted at any time being selected from four predetermined frequencies, the sub-sector-characterising frequency being selected from ten predetermined frequencies, and the small-sector-characterising frequency being selected from ten predetermined frequencies.

4. A beacon as claimed in claim 1 wherein the frequencies from which selection is made are produced from fixed frequency sources, one for each.

5. A radio beacon receiver comprising means for receiving the simultaneous multifrequency transmitted radio beam from the beacon, means for recovering the three modulation frequencies thereof, a plurality of filters each selective of a different one of a like plurality of possible modulation frequencies of the beacon, means for feeding the received recovered modulation frequencies to all said filters in parallel, and three indicator devices adapted to read respectively, hundreds, tens and units of degrees, the said devices being fed, respectively, from four filters each of which is selective of a different one of the sector-characterising frequencies, ten filters each of which is selective of a different one of the sub-sector-characterising frequencies and ten filters each of which is selective of a different one of the small-sector-characterising frequencies.

6. A receiver as claimed in claim 5 wherein the indicator means are constituted by decade counting tubes.

References Cited in the file of this patent

UNITED STATES PATENTS

| | | |
|---|---|---|
| 2,257,320 | Williams | Sept. 30, 1941 |
| 2,462,853 | Frum | Mar. 1, 1949 |
| 2,784,393 | Schultheis | Mar. 5, 1957 |
| 2,817,082 | Dishal et al. | Dec. 17, 1957 |